United States Patent [19]
Grant et al.

[11] Patent Number: 5,436,384
[45] Date of Patent: Jul. 25, 1995

[54] PROCESS FOR THE REMEDIATION OF CONTAMINATED PARTICULATE MATERIAL

[75] Inventors: David C. Grant, Gibsonia; Edward J. Lahoda, Edgewood Borough; C. P. Keegan, South Huntington Twp., all of Pa.

[73] Assignee: Westinghouse Elec. Corp., Pittsburgh, Pa.

[21] Appl. No.: 137,457

[22] Filed: Oct. 18, 1993

[51] Int. Cl.⁶ .............................................. G21F 9/00
[52] U.S. Cl. .......................................... 588/1; 209/17
[58] Field of Search ............................ 588/1; 209/17

[56] References Cited

U.S. PATENT DOCUMENTS

| | | | |
|---|---|---|---|
| 4,056,464 | 11/1977 | Cross | 209/425 |
| 4,234,448 | 11/1980 | Hirano et al. | 252/301.1 |
| 4,293,438 | 10/1981 | Ledebrink et al. | 252/301.1 |
| 4,310,413 | 1/1982 | Cleaveland | 209/456 |
| 4,423,008 | 12/1983 | Yan | 423/7 |
| 4,478,710 | 10/1984 | Smucker et al. | 209/17 |
| 4,614,579 | 9/1986 | Dorph | 209/18 |
| 4,737,315 | 4/1988 | Suzuki et al. | 252/632 |
| 4,772,384 | 9/1988 | Schonert et al. | 209/425 |
| 4,783,253 | 11/1988 | Ayres et al. | 209/2 |
| 4,783,263 | 11/1988 | Trost et al. | 210/638 |
| 4,841,998 | 6/1989 | Bruya | 134/10 |
| 4,882,094 | 11/1989 | Rubin et al. | 252/633 |
| 4,923,125 | 5/1990 | Bateson et al. | 241/20 |
| 5,045,240 | 9/1991 | Skriba et al. | 252/626 |
| 5,056,541 | 10/1991 | Schade et al. | 134/25.1 |
| 5,128,068 | 7/1992 | Lahoda et al. | 252/626 |
| 5,268,128 | 12/1993 | Lahoda et al. | 252/626 |
| 5,316,223 | 5/1994 | Lahoda et al. | 241/24 |

FOREIGN PATENT DOCUMENTS

WO80/1329 6/1980 WIPO.

OTHER PUBLICATIONS

Assink et al., "Extractive Methods For Soil Decontamination...", *Contaminated Soil*, pp. 655–667 (Assink et al. eds., 1986) (Martinus Nijhoff Publishers).
Werther et al., "Sand From Dredge Sludge-Development of Processes...", *Contaminated Soil*, pp. 887–889, (Assink et al. eds., 1986) (Martinus Nijhoff Publishers).
*Chemical Engineers' Handbook*, 1973, (5th ed.), (McGraw-Hill), pp. 20-98 to 20-103.
*Unit Operations of Chemical Engineering*, 1956, (3rd ed.) (McGraw-Hill), p. 771.
*Chemical Engineers' Handbook*, 1973, (5th ed.), (McGraw-Hill), pp. 8-25 to 8-29 and pp. 21-46.

*Primary Examiner*—Ngoclan Mai
*Attorney, Agent, or Firm*—Daniel P. Cillo

[57] ABSTRACT

A method for segregating fines from the clean coarse fraction of the soil, preparing the contaminated fines for subsequent processing, and then separating the contaminants from the clean fines. The process produces a small, highly concentrated contaminanth fraction and a large fraction of clean soil. Metals, metallic compounds, and/or radioactive contaminants are removed from the fine fraction using either gravity separation, multistage gravity separation, a centrifugal jig, regular magnetic or paramagnetic separation using a high gradient magnetic separator, and/or a superconducting separator. Preparation of the fines requires selective segregation of the targeted particles size range and the removal of interfering soil fractions, and vegetation such as root hairs. This preparation is accomplished by a combination of attrition scrubbing, countercurrent jigging, and screening.

15 Claims, 1 Drawing Sheet

PROCESS FOR THE REMEDIATION OF CONTAMINATED PARTICULATE MATERIAL

BACKGROUND OF THE INVENTION

This invention relates generally to a method for the remediation of contaminated particulate matter such as soil. In particular, this invention relates to a method for removing metals, metallic compounds, and/or radioactive contaminants from soil by first segregating the contaminated fines from the clean coarse fraction of the soil, separating any vegetation or other debris from the fine fraction of the soil, and then further treating the contaminated fine portion of the soil to remove metals, metallic compounds, and/or radioactive contaminants using density and/or paramagnetic separation techniques.

Contaminated soil is becoming an increasing environmental problem. Soil may be contaminated with a variety of materials. For example, typical contaminants include, but are not limited to, metals such as copper, lead, and mercury; radioactive contaminants, such as uranium, thorium, or radium; and organics. Metals, metallic compounds, and/or radioactive species are often found in silt, humic, or clay fractions of the soil. In addition, radioactive species may be found in areas where there had been nuclear testing, non-nuclear armaments testing, and mining.

With the environmental problems on the rise, the disposal of contaminated soil is becoming an increasingly important issue. Methods for decontaminating soil are generally disclosed in U.S. Pat. No. 5,128,068, issued to Lahoda et al., on Jul. 7, 1992 (hereinafter "Lahoda patent"), the disclosures of which are incorporated herein by reference in their entirety to more fully describe such methods. Soil washing techniques, such as those described in the Lahoda patent are effective at removing the contamination from soil using physical and chemical means.

A method for separating radioactive and hazardous metal contaminants from soil is disclosed in U.S. Pat. No. 4,783,253 issued to Ayres et al. on Nov. 8, 1988. The method consists of creating a suspension of the soil particles in a column of water. Water is alternately forced up the column to remove the lighter uncontaminated particles, while the heavier particles settle on the bottom. The contaminated heavy soil particles are collected and handled for waste storage.

The method described in U.S. Pat. No. 4,783,253 is limited to those cases when the contamination is present as discrete particles at least 100 microns in size. The method also will not deal with contamination that is associated with or attached to the soil fraction, nor will it work on contamination that is present as particles less than 100 microns in size.

Other methods for treating soil containing radioactive contaminants are disclosed as set forth in U.S. Patent Applications assigned to a common assignee hereof, entitled "Method For Remediating Soil Containing Radioactive Contaminants," U.S. patent Ser. No. 997,076. This patent application discloses a method for remediating uranium and radium contaminated soil by selectively removing the radioactive contamination without removing desirable organic materials that enrich soil and promote plant growth. This remediation technique is based primarily on treating the soil using chemical techniques, such as acid-base and oxidation reactions. Using this method, a leachate solution results that may be amenable to further processing or recycling.

Methods and apparatus employing chemical and physical separation techniques for soil remediation have been described in the Lahoda patent and in U.S. Pat. Nos. 5,268,128 and 5,316,223, both entitled "Method and Apparatus for Cleaning Contaminated Particulate Material," assigned to a common assignee hereof. Generally, these references relate to methods and an apparatus for cleaning particulate matter such as soil through a combination of leaching, washing, attrition scrubbing, countercurrent flow size separation, and physical and/or chemical separation techniques.

Processes such as gravity and magnetic separation techniques have been used successfully in the mineral industry to concentrate metals ores. See, e.g., B. A. Wills, Mineral Processing Technology, Pergamon Press, 1988. For example, gravity techniques have been employed commercially to remove high density metals, such as gold and uranium from ores. Magnetic separation techniques have been employed commercially to separate iron minerals from ore and impurities from clays. Metal cations tend to irreversibly bind to the clay fractions of the soil making disposal problematic. Thus, it is desirable to use such techniques to process soil containing metal, metallic compounds, or radioactive species. However, these processes are not directly transferable to the treatment of soil.

Soil has certain characteristics that do not make it amenable to remediation in these systems. In particular, the soil's nonuniformity makes it difficult to apply these technologies directly. For example, the presence of vegetation and oversize materials in soil, and the adherence of the contaminants onto the soil make soil processing difficult when using gravity and magnetic separation systems. The key to successfully implementing the gravity and magnetic processes disclosed above is the ability of these techniques to handle the soil.

The treatment of fines is particularly problematic because the soil fines tend to contain large amounts of vegetation, particularly root hairs. Root hairs present several problems. First, there is presently no technology available that can decontaminate root hairs, so it is critical that the root hairs be separated from the soil fines. After the root hairs are separated they are typically buried in their contaminated form or incinerated. Second, the root hairs are very light and are not readily treatable using size separation technology, such as mineral jigs. The root hairs tend to float on top of the liquid present in the jig and as a result there is no segregation of contaminants from the root hairs. Third, the root hairs similarly cannot be treated using other physical separation techniques, such as a density separator, because again, they are too light. When root hairs are placed in a density separating device they typically float to the top and are not affected by the force fields. Fourth, the root hairs cannot be decontaminated using chemical techniques such as precipitation or flocculation because the root hairs tend to form a jelly-like mass when treated with the chemical solvents necessary for performing these steps. Once the root hairs become coagulated, they are difficult to handle and treat, which makes further processing essentially impossible. Finally, certain metals and radioactive species tend to get bound up in the membranes of root hairs. Eventually this affects plant growth and ultimately the food chain because these contaminants tend to move through the food chain. See, e.g., Richard Headstrom, Adventures With A Microscope, p. 160 (Dover Publications, Inc., New York 1941); K. W. Brown & Associates, Inc., Irrigation with In Situ Uranium Mining Reclamation Water: Evaluation and Design (August 1982). So it is essential that root hairs be removed from soil streams so the remaining soil may be decontaminated.

In addition, it is not beneficial from an economic standpoint to make all the soil fed to a cleanup process amenable (e.g., by grinding and crushing) to these separation techniques because this would produce a soil product with a very large fines content, making handling difficult, and making the final liquid content too high for land reuse. Large amounts of fines producing pretreatment would also be very costly. Finally, the above mentioned processes for treating fines tend to have much larger costs than do soil washing processes that treat the larger particles.

So there still remains a need for a method that can effectively remove contamination and vegetation from all size fractions of soil, and thus produce a lower volume waste stream and a greater fraction of clean soil.

At the same time, such a method should be economically efficient and be able to interface with soil cleaning methods which can readily remove the larger, non-contaminated soil fraction.

SUMMARY OF THE INVENTION

The present invention addressees these and other needs in the art. This invention presents a method for producing a contaminated fine stream that is readily amenable to treatment using physical separation techniques, such as gravity separation, magnetic separation, or combinations thereof. The present method reduces the cost of treating soil fines because it eliminates steps required using current soil remediation techniques. For example, using the current method, the number of physical steps the soil undergoes may be reduced, such as reducing the number of times the soil undergoes size segregation in a jig. Also, costly chemical steps as precipitation or oxidation may be eliminated entirely. This improved methodology for treating soil fines, particularly those contaminated with root hairs, offers economic and time saving benefits not available using current remediation techniques.

Preparation of the fines requires selective segregation of the targeted particle size range and the removal of interfering soil fractions and vegetation. This separation is accomplished using a combination of attrition scrubbing, countercurrent flow rinsing, and screening techniques.

In particular, this invention relates to a soil-treatment method for removing metals, metallic compounds, and/or radioactive species from contaminated soil by first segregating the contaminated fines from the clean coarse fraction of the soil, separating any vegetation or other debris from the fine fraction of the soil, and then further treating the contaminated fine portion of the soil to remove metals, metallic compounds, and/or radioactive contaminants using density and/or paramagnetic separation techniques.

The method of this invention produces a contaminated fine fraction that is readily treatable by either gravity and/or magnetic separation techniques, and this fine fraction is only a small fraction of the soil fed to the process, and is thus, cost effective. This is due to the fact that although these density and paramagnetic devices operate to remove the relatively small amount of contaminated metals, metallic compounds, and/or radioactive materials from the clean soil, the cost of operating this process is based on the total flow of material which is mainly clean soil. Furthermore, costly chemical treatment steps can be eliminated.

In general, this invention presents a method for removing metals, metallic compounds, and/or radioactive contaminants from particulate matter. In one embodiment of the invention, a method is provided for removing metals, metallic compounds, and/or radioactive contaminants from particulate matter comprising the steps of:
a) feeding the particulate matter;
b) screening the particulate matter;
c) associating the particulate matter from step (b) with a liquid to form a slurry, and scrubbing said slurry to dislodge the fines from the surface of the larger particles;
d) size segregating the fines of step (c) from the larger particles of step (c) contained in the slurry by countercurrent flow of a liquid, whereby the fines are carried with said countercurrent flow as part of a waste slurry;
e) removing vegetation or debris from the fines produced in step (d), thereby forming a contaminated fine stream; and
f) separating the fines of step (e) from metals, metallic compounds, and/or radioactive contaminants using a density separator, a magnetic or paramagnetic separator, or combinations thereof.

DETAILED DESCRIPTION OF THE INVENTION

Figure 1:
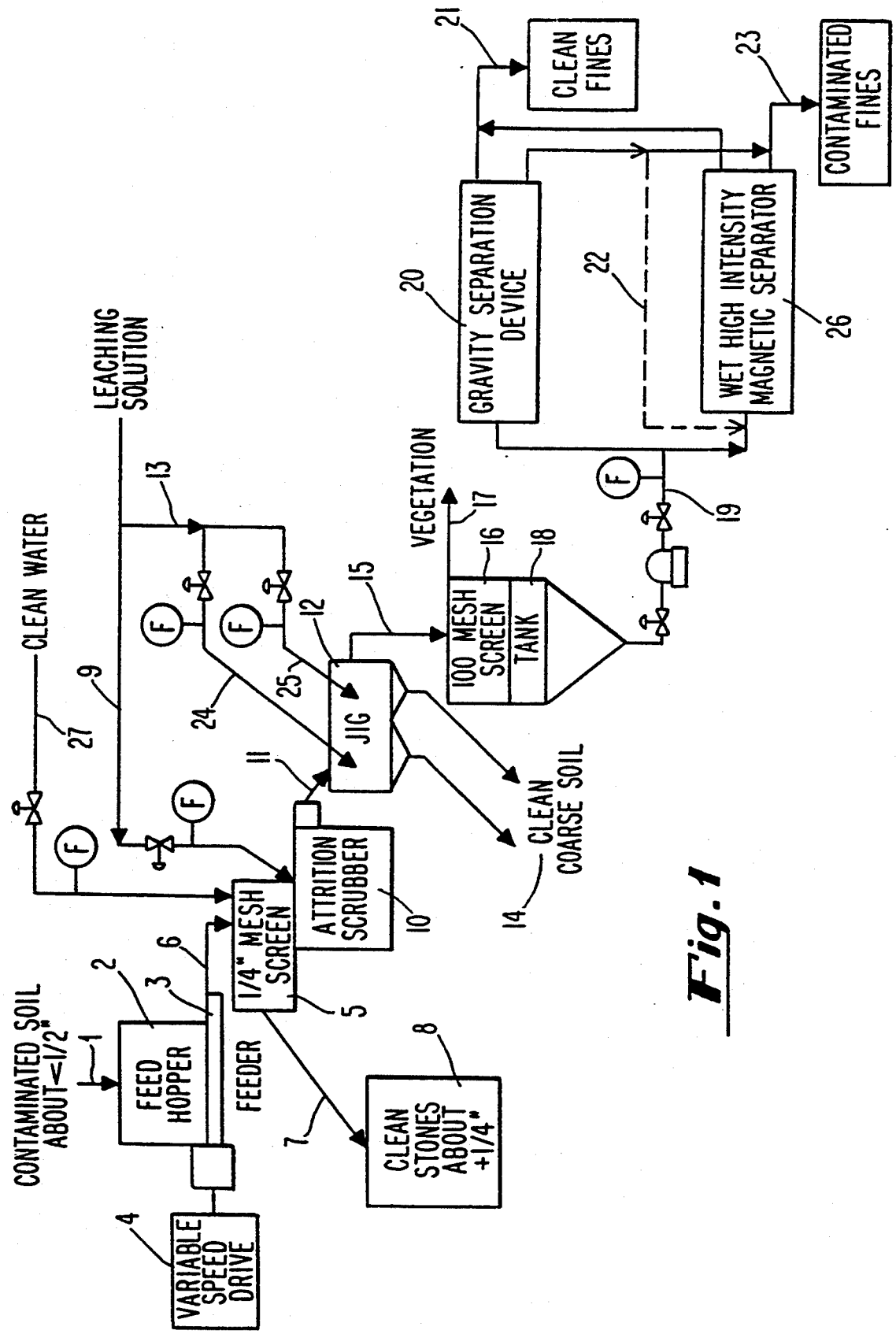
FIG. 1 is a schematic representation of the soil remediation process of the invention.

Generally, this invention presents a method for removing metals, metallic compounds, and/or radioactive contaminants from particulate matter. Metals, metallic compounds, and radioactive materials that may be removed from the soil according to the method of this invention include, but are not limited to, lead, uranium, plutonium, thorium, radium, chrome, copper, zinc, and compounds containing these and other metals.

In one aspect of the invention, a method for removing metals, metallic compounds, and/or radioactive contaminants from particulate matter is presented. This method comprises the steps of:
a) feeding the particulate matter;
b) screening the particulate matter;
c) associating the particulate matter from step (b) with a liquid to form a slurry, and scrubbing said slurry to dislodge the fines from the surface of the larger particles;
d) size segregating the fines of step (c) from the larger particles of step (c) contained in the slurry by countercurrent flow of a liquid, whereby the fines are carried with said countercurrent flow as part of a waste slurry;
e) removing vegetation or debris from the fines produced in step (d), thereby forming a contaminated fine stream; and
f) separating the fines of step (e) from metals, metallic compounds, and/or radioactive contaminants using a density separator, a magnetic or paramagnetic separator, or combinations thereof.

This process is shown schematically in FIG. 1. This diagram, however, does not show the removal steps for plants, nor the scrubbing and screening steps for the largest soil fractions, those fractions having particle sizes of greater than about ½ inch (1.27 cm). This fraction of larger particles is scrubbed and screened from the process. The scrubbing of this fraction of particulate with a contaminant mobilizing solution removes mineral slimes and/or fine particles that may adhere to the larger particles.

Equipment suitable for the scrubbing and screening include, but are not limited to, grizzlys, drum washers, classifiers, rotary screens, vibrating screens, stationary sieves and froth flotation. Other suitable equipment will be apparent to those skilled in the art and may be used without detracting from the spirit of the invention.

Although not shown in the process, contaminants that have a high affinity for the fines can be mobilized from the soil during the scrubbing step using suitable chemicals. In the context of this invention, the terms "contaminant mobilizing solution," "fluidizing solution," "leaching solution," "leaching agent," and "washing solution" are used interchangeably.

Generally, the contaminant mobilizing solution comprises leaching solutions, dispersing agents, surfactants, and mixtures thereof to mobilize soluble and dispersible contaminants in a liquid phase of the contaminate mobilizing solution. The particular washing fluid will depend on the contaminants sought to be removed. Leaching solutions are generally known and those suitable for practicing this invention will be apparent to those skilled in the art. Suitable washing fluids for removing soluble radioactive compounds include, but are not limited to, potassium carbonate, sodium carbonate, acetic acid, sodium hypochlorite, and others. For dispersible contaminants the washing solution will typically include a surfactant and/or dispersing agent. Surfactants and/or suspending agents are generally known to those skilled in the art and any suitable surfactant and/or suspending agents may be used without detracting from the spirit of the invention. Suitable surfactants include, but are not limited to, soaps, detergents, sodium hexametaphosphate, and others. Combinations of surfactants and leaching solutions may be used depending on the particular contaminants to be removed. Dispersing agents suitable for practicing this invention include, but are not limited to, caustic or sodium hexametaphosphate, and sulfonic acid salts. Preferably, caustic or sodium hexametaphosphate are used.

After scrubbing the soil larger fraction and mobilizing the soluble contaminants, the soil stream remaining after this initial scrubbing is treated further. The fine stream left after the initial scrubbing, discussed above, contains particles that have a particle sizes from about less than 1 micron to about 100 microns. This fine fraction is separated in the following steps.

The contaminated soil (1) is held in hopper (2) and fed to the process (6) using a controlled feeding device, for instance, a screw feeder (3) run with a variable five-speed drive (4) or a weigh belt feeder. The soil fine fraction passes through line 6 and is washed and then screened or separated 5 to remove debris and larger solids having particle sizes from about ¼ inch to about ½ inch. The non-contaminated stones are discharged through line 7 into a reservoir for clean stones 8. The screened solids are then fed into the attrition scrubber 10. Water or dispersing agent is also fed into the scrubber 10 through line 9. The soil is aggressively scrubbed 10.

Due to particle to particle interaction, fines are removed from the surface of the larger particles during the vigorous scrubbing in the attrition scrubber 10. The slurry formed after the scrubbing is discharged into a mineral jig 12 through line 11.

The mineral jig is not used in the conventional manner, that is, as a density separator. But rather, the mineral jig is used in a countercurrent mode as a very effective particle size segregation device. Using the mineral jig in this manner the fines and vegetation may be separated from the slurry and the soil simultaneously washed.

The jig's operating conditions, such as the bedding material, upflow rate, and stroke length, may be adjusted depending on the size of the fines and vegetation to be removed and the physical and chemical characteristics of the soil. The adjustment is made to selectively remove the contaminated fine fraction and balance the percentage of soil particles recovered and allowable levels of residual contamination.

The velocity of the upward flow of the contaminant containing solution in the jig is set to separate fines from less than 200 microns to less than about 325 microns and any vegetation. Generally, the upward flow rate may be between about 1 gpm/ft$^2$ to about 40 gpm/ft$^2$ preferably about 2 gpm/ft$^2$ to about 30 gpm/ft$^2$ more preferably at about 7 gpm/ft$^2$ to about 25 gpm/ft$^2$. (Note: 1 gpm/ft$^2$=40.7 liters per minute/meters$^2$). These settings may be dictated by the quality of the soil that is being decontaminated. The examples set forth some optimization techniques.

For countercurrent flow operations, the jig may be operated at a stoke length between about 1/16 to about 2 inches (about 0.16 to about 5.08 cm), preferably about ⅛ to 1½ inches (about 0.32 to about 3.81 cm), more preferably at about 3/8 inch to about 1 inch (about 0.95 to about 2.54 cm). These setting may be dictated by the quality of the soil that is being decontaminated. The examples set forth some optimization techniques.

The jig bedding material may be gravel, round or oblong beads of various materials such as, but not limited to, alumina, silver, zircon that are about ¼ to about 1 inch (about 0.64 to about 2.54 cm) in diameter, preferably gravel having a diameter of about ⅜ to about ½ inch (about 0.95 to about 1.27 cm). These setting may be dictated by the quality of the soil that is being decontaminated. The examples set forth some optimization techniques.

Segregation is accomplished by countercurrent flow of a liquid. Suitable liquids include, but are not limited to, chemical leaching or water fluids, supplied to the jig through the feed line 13.

Segregation by countercurrent flow is performed by introducing the fines and larger particles (11) into the jig 12 with the first counter current flow 24, and, if necessary, introducing an additional liquid a second countercurrent flow 25, whereby the fines are carried over the top of the jig 15 with said counterflow as part of a waste slurry.

Typically, fines smaller than about 60 microns are removed in the waste slurry. The actual maximum size of particles removed may be dependent on the contaminated distribution as a function of particle size, and can vary from about 1 to about 200 microns.

The larger particles 14 pass through the bed of the jig 14, the particle size of these larger particles range from about 10–20 microns to about ¼ inch (0.64 cm). These larger particles are further scrubbed as they pass through the bed of the jig 12 and are eventually discharged from the bottom of the jig 14.

The contaminated fine fraction that is carried over the top of the jig 15 is further passed through a vibrating screen 16, or any other type of screen suitable for such separation, to remove any further debris or vegetation, particularly root hairs; this vegetation or debris is discharged through line 17. The fines remaining after the jig treatment generally have a particle size of about less than 100 microns.

It is essential to remove the root hairs or other organic matter before further soil processing. The root hairs' separation is essential to the effective operation of the physical separation techniques—magnetic separation, paramagnetic separation, or density separation. The root hairs and other organic matter are not segregated in the jig 15 because the root hairs are very light and typically float to the top. But because the root hairs are so light they always travel with the fines; however, they generally have longer lengths, so they may be separated from the fine particles. Typically, the range of solids that may be separated in the jig step range between from about 20 microns to about ¼ inch (0.64 cm). To effect separation of the root hairs from the fines, an appropriate screen size is one that is smaller than the root hairs sought to be separated and sufficient to allow the desired size to remain on the screen so it may be discharged 17 and undergo further processing. These precise parameters will be determined based on the soil that is being separated. The examples offer some optimization techniques. In certain preferred embodiments, the screen size is bigger than the particles discharged from the bottom of the jig 12.

The fines then pass into the feed tank for later discharge into a separation device 20 or 26, or combinations thereof.

The contaminated fine fractions produced according to the method set forth above are further processed to remove contaminated metals, metallic compounds, and/or radioactive contaminants. This further decontamination step may be accomplished using various techniques, which include, but are not limited to the methods discussed in the following embodiments.

In one embodiment, the uncontaminated fine soil is separated from the metals, metallic compounds, and/or radioactive contaminants by introducing said fine stream 19 into a density separating device 20. The decontaminated fines pass out through line 21 while contaminated fines pass through line 23. Such a device can utilize centrifugal, frictional, or inertial forces to expand the use of the conventional mining techniques used to separate metals from ores into the treatment of fines. Suitable density separating devices include, but are not limited to, centrifuges, shaking tables, vibrating tables, such as a multi-gravity separator ("MGS", a trade name of Mozzley), or a centrifugal jig.

A density separating device such as an MGS enhances the performance of a conventional vibrating table by wrapping the horizontal vibrating surface into a tube and rotating at several hundred revolutions per minute (rpm). Thus, a force many times the normal gravity pull can be exerted onto the particles in the film flowing across the surface thus enhancing the density separation process. This piece of equipment is much smaller and more versatile than conventional tables, and is effective at particle sizes as small as one micron. In a similar approach, the performance of a conventional mineral jig is enhanced in a centrifugal jig by providing high rotational speeds on the jig bed. In addition, a conventional vibrating table gravity separator may be used without detracting from the spirit of the invention. Other suitable gravity separating devices or techniques will be apparent to those skilled in the art and may be used without detracting from the spirit of the invention.

In another embodiment, the fine soil stream is separated from the contaminated metals, metallic compounds, and/or radioactive contaminants by introducing said fine soil stream into a paramagnetic separating device 26, with the decontaminated fines leaving through line 21, and contaminated fines leaving through line 23. Paramagnetic techniques and equipment for separating contaminants from the fine soil fraction include, but are not limited to, conventional high gradient magnetic separators or superconducting separators. In the context of this invention, "magnetic" means materials exhibiting ferromagnetism-exhibited by materials such as metals, alloys, and compounds of the transition (iron group) rare-earth and actinide elements, in which the internal magnetic moments spontaneously organize in a common direction. A magnetic separator is a machine for separating magnetic from less magnetic or nonmagnetic materials using strong magnetic fields. "Paramagnetic" as used herein, means substances within which an applied magnetic field is increased by the alignment of electron orbits—substances with unpaired electrons in the electron orbits. Examples include uranium and plutonium.

Paramagnetic separation requires high magnetic forces. Thus, in a more preferred embodiment, the magnetic force in conventional high-intensity magnetic separators can be increased by increasing the magnetic field gradient. This may be accomplished by filling the working volume of a paramagnetic separator with a matrix of secondary poles, wherein said secondary poles are selected from the group consisting of ball wire and wire wool. The contaminated fine slurry is fed into this matrix 19 which removes the paramagnetic material by capture onto the matrix. The decontaminated soil exits through line 21, and contaminated fines leave through line 23. Periodically the magnetic field is removed and the paramagnetic material is rinsed from the matrix. Superconducting magnets offer the ability to supply higher magnetic forces in these separators. Other methods of achieving paramagnetic separation will be apparent to those skilled in the art and may be used without detracting from the spirit of the invention.

The high magnetic forces required for removing the contaminants from the soil will cause all magnetic components to be removed from the soil. In yet another preferred embodiment, the separation process may incorporate a series of paramagnetic or regular magnetic separating devices, wherein the first paramagnetic or regular magnetic separating device has a lower magnetic force that allows the non-contaminated fraction of particulate matter to be separated from the contaminated fraction before the contaminated fraction passes through the second paramagnetic separator having a higher magnetic field. This will allow the noncontaminated magnetic fraction of the soil to be separated from the paramagnetic contaminate fraction, and thus result in a more concentrated, lower volume contaminate stream.

In still another embodiment, the fine soil stream is separated from the metals, metallic compounds, and/or radioactive contaminants by first passing the fine stream 19 through a density separator 20, followed by passing the density treated fine stream 22 through a paramagnetic separator 26. The decontaminated fines leave through line 21, and contaminated fines leave through line 23. This combination provides a synergistic approach to separation. In particular, the higher throughput density separation devices can be used to separate out a large fraction of the contamination, while the paramagnetic devices can be used as a polishing step.

The preferred separation technique is the paramagnetic/magnetic separation process. The density separation step is more preferred because it is generally the least expensive technique.

The present invention is further described in the following examples. These examples are for illustrative purposes only and are not to be construed as limiting the appended claims.

EXAMPLE 1

Determining Operating Conditions for the Decontamination System Using Surrogate Plutonium Contaminant Soil is tested using soil washing and gravity separation equipment, and using magnetic separation equipment. This testing is used to optimize equipment settings and to identify any potential safety issues before start of testing on actual contaminated material. The operating variables on the major pieces of equipment to be used are listed in Table 1 for the soil washing system, in Table 3 for the gravity separation system, and in Table 2 for the magnetic separation system. Actual testing is needed to fine tune the conditions.

The key here is how well the soil and surrogate contaminant compare to the actual contaminated soil. It is expected that the uncontaminated soil will be chemically and physically identical to the actual contaminated soil. In particular, a specific gravity measurement and particle size analysis is performed on both materials to verify that they are in fact physically similar. The size distribution will affect the operating conditions of the equipment and the collection requirements for the various process streams.

The characteristics of the surrogate selected, for example, copper metal, must also be representative of the plutonium oxide, the desired contaminant to be removed in this example. In particular, the particle size, the specific gravity, and magnetic properties must be similar. The use of a surrogate contaminant provides an indication of what will occur with the actual soil. The simulated soil will provide an indication of what conditions are required for the actual soil and will verify that the system can safely handle this material.

The material should be well blended and sized to minus one-half inch. During testing, the samples listed in Table 4 will be taken. In addition, the processing information listed in Table 5 will be monitored and collected during each run. This includes the solid and liquid feed rates and the weights or volumes of each collected process stream. A density and weight percent solids is determined on each stream. This information is used to determine a complete material balance on each piece of equipment. In addition, a particle size analysis is performed on the streams to determine the ability of the process to selectively segregate the soil fine fraction.

This surrogate testing insures that the process can be safely operated on actual contaminated soil. The system is designed and operated to minimize the potential for spills, containment of spills or leaks, minimize operator contact with the contaminant, and allow ease of required sampling. Modification may be necessary depending on the particular results of the study.

EXAMPLE 2

Segregation of Plutonium Contaminated Fines

The sampling, monitoring, and analysis as discussed for the surrogate material in Example 1 and listed in Table 4 is performed here on the actual material. The radioactivity of each soil sample is analyzed and a radioactive analysis is performed on each size fraction generated in the particle size analysis to verify that the desired contaminant segregation by particle size is being achieved. The actual screens to be used in the particle size analysis is determined from data about the actual soil sample.

The length of each run is about 30 to 60 minutes and is sufficient to insure that steady state has been reached in the system. Samples of each stream are taken at 5 to 10 minute intervals to verify this. The analysis of each stream should not vary significantly with time if steady-state has been reached.

Based on the results of a given run, the operating conditions of the process will be varied to optimize the performance of the system. In particular, the system will be evaluated to determine the decontamination achieved, the volume of concentrated waste generated, the volume of secondary wastes generated, and processing rates.

Certain chemicals (e.g., caustic or sodium hexametaphosphate, etc.) could aid the physical segregation process. But the chemical should be carefully metered into the system and its level carefully monitored. To minimize the generation of secondary wastes and to most effectively utilize resources, the water used in the process is recycled. If a chemical is added, it will eventually build up in the system, and its concentration and addition must be carefully controlled. The clean soil will contain process water and thus, the chemical used. It may thus be necessary to rinse the soil before discharge, which would add to the water usage and add to the processing required. If a chemical is used to help disperse fires or mobilize the contaminant particles, subsequent dewatering of these contaminants may be more difficult.

EXAMPLE 3

Gravimetric Separation of Plutonium Contaminants From Soil Fines

The contaminated fines slurry generated from the soil washing system in Example 2 are tested using a multi-gravity separator. This testing determines the operating conditions required to segregate the contamination from the clean soil fines. The samples and analysis listed in Table 2 for the gravity separator will be taken to determine the degree of separation achieved. The separation is optimized by selectively varying the operating parameters listed in Table 2.

The testing examines the effect of solid feed rate on the systems performance. The testing performed determines the maximum processing rate achievable with this given soil, and the effect of feed rate on the unit's performance. The generation of this information is essential for scaling up the process.

The effect of increased forces to improve the separation of the contaminants will be examined. The forces may include centrifugal, frictional, or inertial, depending on the device.

EXAMPLE 4

Magnetic Separation of Plutonium Contaminants from Soil Fines

The contaminated fines slurry generated from the soil washing system in Example 2, the clean soil product produced from the gravitational device Example 3, and the contaminated concentrate from the gravitational device are tested using the High Gradient Magnetic Separators ("HGMS"). The sampling and analysis listed in Example 4 will be carried out in determining the performance measurements described above.

This testing examines the effect of solid feed rate and particle size on the systems performance. The solids throughput in the magnetic separation units is determined by the magnetic field strength, the physical dimensions of the magnetized separation volume, and by stream and magnetic characteristics. The testing performed will determine the effects of feed rate, soil characteristics, and system parameters on performance. This information can be used for scaling the system, for determining separation efficiency, for determining waste stream volume, and for cost estimation.

Although the above example pertains to the separation of a plutonium containment, this process is explicable to any metal or radioactive containment.

TABLE 1

Operating Parameters Available For Soil Washing System Optimization

| Equipment | Operating Variables |
|---|---|
| 1) Attrition Scrubber | a) Residence Time |
|  | b) Solid to Liquid Weight Ratio |
| 2) Mineral Jig | a) Solid Feed Rate |
|  | b) Upflow Rate |
|  | c) Pulse Length and Frequency |
|  | d) Bedding Material |

TABLE 2

Operating Parameters Available for MGS Optimization

| Parameter |
|---|
| Solid Feed Rate |
| Rotational Speed |
| Shake Frequency |
| Shake Amplitude |

TABLE 3

Operating Parameters Available for High Intensity Magnetic Separation Optimization

| Operating Parameter |
|---|
| Solids Feed Rate |
| Magnetic Field Strength |
| Matrix Packing Density |
| Matrix Packing Material |

TABLE 4

Sampling and Analysis Plan

| Stream | Analysis |
|---|---|
| 1) Soil Feed | a) Contaminant Analysis |
|  | b) Moisture Content |
|  | c) Sieve Analysis |
| 2) Attrition Scrub Product Soil | a) Contaminant Analysis |
|  | b) Moisture Content |

TABLE 4-continued

Sampling and Analysis Plan

| Stream | Analysis |
|---|---|
|  | c) Sieve Analysis |
| 3) Attrition Scrub Product Water | a) Contaminant Analysis |
| 4) Mineral Jig Bottoms | a) Contaminant Analysis |
|  | b) Moisture Content |
|  | c) Sieve Analysis |
| 5) Mineral Jig Overflow | a) Contaminant Analysis |
|  | b) Moisture Content |
|  | c) Sieve Analysis |
| 6) Gravity Device Concentrate | a) Contaminant Analysis |
|  | b) Moisture Content |
|  | c) Sieve Analysis |
| 7) Gravity Device Tailings | a) Contaminant Analysis |
|  | b) Moisture Content |
|  | c) Sieve Analysis |
| 8) HGMS Feed | a) Contaminant Analysis |
|  | b) Weight Recovery |
|  | c) Moisture Content |
|  | d) Particle Size |
|  | e) Magnetic Susceptibility |
| 9) HGMS Magnetics | a) Contaminant Analysis |
|  | b) Weight Recovery |
|  | c) Moisture Content |
|  | d) Particle Size |
|  | e) Magnetic Susceptibility |
| 10) HGMS Non-Magnetics | a) Contaminant Analysis |
|  | b) Weight Recovery |
|  | c) Moisture Content |
|  | d) Particle Size |
|  | e) Magnetic Susceptibility |

TABLE 5

Process Parameters to be Monitored During Tests

| Soil Feed Rate: | lb/hr (kg/hr) |
|---|---|
| Water Feed Rate: | GPM |
| Mineral Jig Bottoms: | lb (kg) |
| Mineral Jig Overflow: | Gal (liters) |
| Gravity Device Feed Rate: | GPM |
| Gravity Device Concentrates: | lb (kg) |
| MGS Tails: | Gal (liters) |
| HGMS Magnetics | lb (kg) |
| HGMS Non-Magnetics: | lb (kg) |

We claim:

1. A method for removing contaminant metals, metallic compounds, and/or radioactive contaminants from particulate matter, said particulate matter comprising vegetation including root hairs, debris, and fine through large fractions, said method containing the steps of:

a) feeding the contaminated particulate matter into a feed hopper;

b) screening the particulate matter using a screening device to remove vegetation, debris and solids over about ¼-inch particle size, providing root hairs, fine and intermediate particulate matter;

c) associating the root hairs, fine and intermediate particulate matter from step (b) with a liquid to form a slurry, and scrubbing said slurry to dislodge the fines and root hairs from the intermediate particulate matter;

d) size segregating the fines and root hairs of step (c) from the intermediate particulate matter of step (c) contained in the slurry by countercurrent flow of a liquid, whereby contaminated fines and root hairs are carried with said countercurrent flow as part of a waste slurry, where clean particulate matter is recovered;

e) removing root hairs from the waste slurry produced in step (d), using a screening means effective to separate the root hairs, thereby forming a contaminated fine stream and a contaminated root hairs stream and f) separating the fines of step (e) from metals, metallic compounds, and/or radioactive contaminants using a density separator, a regular magnetic or paramagnetic separator, or combinations thereof, and collecting the contaminated root hairs of step (e).

2. The method of claim 1 wherein said scrubbing of step (c) comprises using grizzlys, drum washers, classifiers, froth flotation devices, attrition scrubbing or combinations thereof.

3. The method of claim 1 wherein step (d) further comprises size segregation of the particles of step (c) using water, leaching agents, dispersing agents, surfactants, or combinations thereof.

4. The method of claim 1 where the root hairs in the particulate matter feed include fine, light root hairs of various lengths, where lengths of root hairs are larger than particle sizes of the fines, where contaminant metals, metallic compounds and/or radioactive species are bound up in the membranes of the root hairs.

5. The method of claim 1 wherein step (f) comprises introducing said fine stream of step (e) into a density separating device.

6. The method of claim 1 wherein step (f) comprises introducing said fine stream of step (e) into a paramagnetic or regular magnetic separating device.

7. The method of claim 1 wherein step (f) comprises introducing said fine stream of step (e) into a paramagnetic or regular magnetic separating device having an increased magnetic field.

8. The method of claim 1 wherein step (f) comprises introducing said fine stream of step (e) into a series of paramagnetic or regular magnetic separating devices, wherein the first paramagnetic or regular magnetic separating device has a lower magnetic force than other devices in the series which allows the non-contaminated magnetic or paramagnetic fraction of particulate matter to be separated from the contaminated fraction before the contaminated fraction passes through the second paramagnetic or regular magnetic separator having a higher magnetic field.

9. The method of claim 1 wherein step (f) comprises introducing said fine stream of step (e) into a density separator, followed by passing the fine stream through a paramagnetic or regular magnetic separator.

10. The method of claim 1 wherein step (e) further comprises utilizing a screening device having a screen size smaller than the root hairs sought to be removed, the root hairs of step (g) are further processed and steps (a)–(f) are in consecutive order.

11. The method of claim 1 wherein step (d) further comprises setting the countercurrent flow of the liquid to remove fines of a certain size.

12. The method of claim 1 wherein step (c) further comprises associating said particulate matter of step (b) with water, leaching agents, dispersing agents, surfactants, or combinations thereof.

13. The method of claim 1 wherein step (d) comprises size segregation of the particulate matter in a countercurrent flow mineral jig.

14. The method of claim 1 wherein the root hairs are light and travel with the fines, which fines have particle sizes of from about 1 to about 200 microns, and the root hairs generally have longer lengths so they can be separated from the fines.

15. The method of claim 1 wherein the fines have particle sizes smaller than 60 microns.

* * * * *